Patented May 5, 1925.

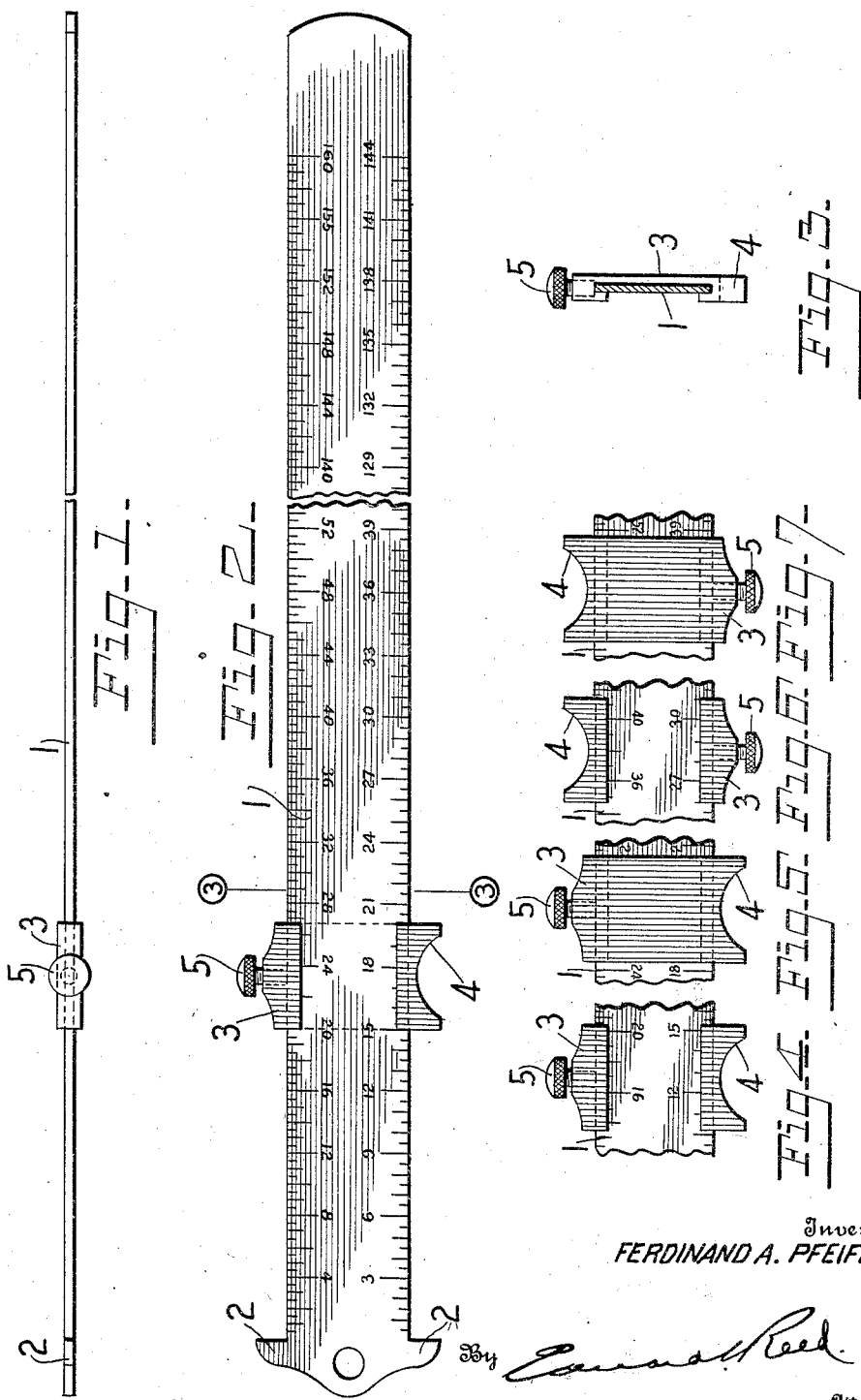

1,536,307

UNITED STATES PATENT OFFICE.

FERDINAND A. PFEIFER, OF SPRINGFIELD, OHIO, ASSIGNOR TO THE EAGLE ENGINEERING COMPANY, OF SPRINGFIELD, OHIO, A CORPORATION OF OHIO.

PRINTER'S CALIPER.

Application filed December 16, 1921. Serial No. 522,740.

*To all whom it may concern:*

Be it known that I, FERDINAND A. PFEIFER, a citizen of the United States, residing at Springfield, in the county of Clark and State of Ohio, have invented certain new and useful Improvements in Printers' Calipers, of which the following is a specification, reference being had therein to the accompanying drawing.

This invention relates to a printer's caliper for use in measuring forms and the like.

An ordinary rule can not be conveniently used for measuring type because the type faces project above the body of the type and space the edge of the rule so far from the bodies that the measurements can not be accurately determined.

One object of the invention is to provide such a device with which type can be quickly and accurately measured.

A further object of the invention is to provide a single device with which type may be measured accurately according to any one of a plurality of scales.

A further object of the invention is to provide a device of this kind which will be simple in construction and inexpensive to manufacture.

Other objects of the invention may appear as the device is described in detail.

In the accompanying drawings Fig. 1 is an edge view of a device embodying my invention; Fig. 2 is a front elevation of such a device; Fig. 3 is a transverse sectional view on the line 3—3 of Fig. 2; Figs. 4, 5, 6, and 7 are detail views showing different positions in which the knee may be mounted on the rule.

In carrying out my invention I provide a rule having a scale along one or more edges thereof and having parts adapted to engage the bodies of the type while the edge of the rule rests upon the faces of the type, one of said parts being movable over the scale on said rule to enable the measurement to be determined when both parts are in engagement with the type. In the present drawings I have illustrated one embodiment of my invention but it will be understood that this has been chosen for the purpose of illustration only.

In that form of the device here shown the caliper comprises a body portion, or rule, 1, which, as here shown, is provided along each edge with a scale, each scale being based upon a different unit of measurement. The lower scale, as shown in Fig. 2, is pica and the upper scale is in one-sixteenths of an inch. If desired the opposite faces of the rule may also be provided at both edges with scales and these scales may be different one from the other and from those shown in Fig. 2. At one end of the scales the rule is provided with projections, or hooks, 2 extending beyond the edges thereof distances sufficient to enable the hook to engage the body of the type when the adjacent edge of the rule is resting upon the face of the type. Slidably mounted upon the rule is the adjustable measuring member, or slide, 3, the lower portion of which is provided with a projection 4 also arranged to engage the body of the type when the adjacent edge of the rule is resting upon the faces of the type. This slide is freely movable along the rule and may be locked in adjusted positions in any suitable manner, as by means of a set screw 5, when it is desired to transfer the measurement from one form to another. The edge of the slide adjacent to the hook 2 constitutes a measuring edge and will indicate on the scale the distance between the fixed hook at the end of the rule and the projection on the slide. To facilitate the reading of the figures on the scale I have cut away the intermediate portion of one wall of the slide, permitting this wall to extend upwardly and downwardly from the respective ends of the slide far enough to form guideways into which the respective edges of the rule extend. In making measurements it is, of course, necessary that that edge of the rule which is scaled according to the measurement desired should be adjacent to the type and that the scale should be on that face of the rule adjacent to the operator. In order that a plurality of scales may be used the slide is made reversible. By slipping the slide off the end of the rule and turning it face for face and replacing it on the rule the open, or reading side, thereof will be arranged on the opposite face of the rule, it being noted that both edges of the slide are straight and constitute measuring edges and that the slide has a projection, or hook, 4 in line with each measuring edge. By removing the slide from the rule and inverting it, it may be again placed on the rule with the open face thereof on either side and with the projections, or hooks, on the slide extending from the opposite edge of the rule, that is, the upper edge in Fig. 2. In this manner I am enabled to take readings from any one of the four scales on the rule and these readings will be absolutely accurate. The device is exceedingly simple, both in construction and operation and can be produced at a low cost. Further, it has no parts likely to be disarranged or distorted so as to affect the accuracy of the reading. The construction is such that the rule can be very quickly applied to a form and the measurement determined and, if desired, the slide may be locked in its adjusted position to preserve the measurement or transfer the same to another form.

While I have shown and described one embodiment of my invention I wish it to be understood that I do not desire to be limited to the details thereof as various modifications may occur to a person skilled in the art.

Having now fully described my invention what I claim as new and desire to secure by Letters Patent, is:

1. In a printer's caliper, a rule having a scale on each face thereof and having at one end type engaging projections extending beyond the respective edges thereof, and a slide reversibly mounted on said rule, having type engaging projections at each side thereof and having a measuring edge adjacent to each of said projections.

2. In a printer's caliper, a rule having a plurality of scales thereon and provided with type engaging projections extending beyond the respective edges thereof, and a slide reversibly mounted on said rule and having a type engaging projection adapted to be arranged in opposed relation to either of the type engaging projections on said rule, said slide being adapted to be brought into operative relation with different scales on said rule when said slide is reversed on the rule.

3. In a printer's caliper, a rule having a scale on each face thereof and provided with a type engaging projection extending beyond one edge thereof, a slide mounted on said rule, having type engaging projections on both sides thereof and having a measuring edge adjacent to each projection, said slide being reversible on said rule to position the same with either edge thereof in measuring position and with either type engaging projection in opposed relation to the type engaging projection on said rule.

4. In a printer's caliper, a rule having a scale at each edge of each face thereof and provided at one end with type engaging projections extending beyond the respective edges thereof, a slide mounted on said rule, having a type engaging projection at each side thereof and having a measuring edge adjacent to each type engaging projection, said slide also having an opening in one face thereof and being reversible on said rule to position said opening adjacent to either face of said rule and to cause the type engaging projections to extend beyond either edge of said rule.

In testimony whereof, I affix my signature hereto.

FERDINAND A. PFEIFER.